(12) United States Patent
Carlstrom

(10) Patent No.: US 9,922,000 B2
(45) Date of Patent: Mar. 20, 2018

(54) PACKET BUFFER WITH DYNAMIC BYPASS

(71) Applicant: Marvell World Trade Ltd., St. Michael (BB)

(72) Inventor: Jakob Carlstrom, Uppsala (SE)

(73) Assignee: Marvell World Trade Ltd., St. Michael (BB)

( * ) Notice: Subject to any disclaimer, the term of this patent is extended or adjusted under 35 U.S.C. 154(b) by 379 days.

(21) Appl. No.: 14/835,372

(22) Filed: Aug. 25, 2015

(65) Prior Publication Data
US 2016/0055118 A1   Feb. 25, 2016

Related U.S. Application Data

(60) Provisional application No. 62/041,293, filed on Aug. 25, 2014.

(51) Int. Cl.
| | |
|---|---|
| *H04L 29/08* | (2006.01) |
| *G06F 15/167* | (2006.01) |
| *H04L 12/851* | (2013.01) |
| *H04L 12/863* | (2013.01) |

(52) U.S. Cl.
CPC .......... *G06F 15/167* (2013.01); *H04L 47/245* (2013.01); *H04L 47/6215* (2013.01)

(58) Field of Classification Search
CPC ......... H04L 47/10; H04L 47/24; H04L 47/22; H04L 47/2441; H04L 47/2408; H04L 47/28; H04L 47/2475; H04L 47/60; H04L 47/6215; H04L 47/245; G06F 12/11; G06F 12/15; G06F 12/16; G06F 12/167; G06F 13/18

USPC ......................................... 370/412; 709/213
See application file for complete search history.

(56) References Cited

U.S. PATENT DOCUMENTS

| | | |
|---|---|---|
| 7,558,890 B1 | 7/2009 | Li et al. |
| 7,606,249 B1 | 10/2009 | Swenson |
| 7,664,823 B1 | 2/2010 | Wakerly |
| 8,615,629 B2 | 12/2013 | Sukonik et al. |
| 9,171,030 B1 | 10/2015 | Arad et al. |
| 2003/0095558 A1 | 5/2003 | Chung et al. |

(Continued)

OTHER PUBLICATIONS

International Preliminary Report on Patentability in International Patent Application No. PCT/IB2015/001874, dated Mar. 9, 2017 (9 pages).

(Continued)

*Primary Examiner* — Afsar M Qureshi

(57) ABSTRACT

A write queue, for queuing a packet in a traffic manager coupled to a memory device, is selected from among a preemptable write queue configured to queue packets that are candidates for being retrieved from the traffic manager before the packets are written to the memory device and a non-preemptable write queue configured to queue packets that are not candidates for being retrieved from the traffic manager before the packets are written to the memory device. The packet is written to the selected write queue. A read request is generated for retrieving the packet from the memory device, and it is determined whether the packet is queued in the preemptable write queue. If the packet is queued in the preemptable write queue, the packet is extracted from the preemptable write queue for retrieving the packet from the traffic manager before the packet is written to the memory device.

20 Claims, 5 Drawing Sheets

(56) References Cited

U.S. PATENT DOCUMENTS

| | | | |
|---|---|---|---|
| 2005/0169173 A1* | 8/2005 | Mahdavi | H04L 47/10 370/230 |
| 2011/0179200 A1 | 7/2011 | Sukonik et al. | |
| 2014/0082118 A1* | 3/2014 | Chan | G06F 15/167 709/212 |
| 2014/0198803 A1* | 7/2014 | Dalal | G06F 13/16 370/413 |
| 2014/0215961 A1* | 8/2014 | Pedersen | B65D 71/0096 52/745.06 |
| 2014/0301394 A1 | 10/2014 | Arad et al. | |
| 2014/0310307 A1 | 10/2014 | Levy et al. | |

OTHER PUBLICATIONS

International Search Report and Written Opinion for PCT/IB2015/001874, dated Jan. 28, 2016, 13 pages.

* cited by examiner

PACKET BUFFER WITH DYNAMIC BYPASS

CROSS-REFERENCE TO RELATED APPLICATIONS

This claims the benefit of U.S. Provisional Patent Application No. 62/041,293, entitled "Packet Buffer with Dynamic DRAM Bypass" and filed on Aug. 25, 2014, the disclosure of which is hereby incorporated herein by reference.

FIELD OF THE DISCLOSURE

The present disclosure relates generally to networks and, more particularly, to packet buffering implemented in network devices.

BACKGROUND

Network devices, such as routers or switches, often include memory devices for buffering packets ready for transmission, for example to implement traffic management of different flows transmitted by the network devices, or merely to temporarily store packets when transmit ports are not immediately available for transmission. Memory controllers coupled to such memory devices typically include queues for queuing write requests for writing packets to the memory devices and read request queues for queuing read requests for reading packets from the memory devices. The memory controller implements a suitable scheduling scheme for providing access to the memory device such that write requests and read requests can be executed in some fair and/or efficient manner. Generally, writing packets to the memory device and reading packets from the memory device creates a load on a bus that connects the memory controller to the memory device.

SUMMARY

In an embodiment, a method of managing network packets in a traffic manager coupled to a memory device includes selecting, at a queue manager of the traffic manager, a write queue for queuing, at the traffic manager, a packet to be written to the memory device, including selecting the write queue from among (i) a preemptable write queue configured to queue packets that are candidates for being retrieved from the traffic manager before the packets are written to the memory device and (ii) a non-preemptable write queue configured to queue packets that are not candidates for being retrieved from the traffic manager before the packets are written to the memory device. The method also includes writing, by the queue manager, the packet to the selected one of the preemptable write queue or the non-preemptable write queue. The method further includes generating, at the traffic manager, a read request for retrieving the packet from the memory device. The method additionally includes determining, by a preemptor engine of the traffic manager, whether the packet is queued in the preemptable write queue. The method further still includes in response to determining that the packet is queued in the preemptable write queue, extracting, by the preemptor engine, the packet from the preemptable write queue for retrieving the packet from the traffic manager before the packet is written to the memory device.

In other embodiments, the method includes any suitable combination of one or more of the following features.

Selecting the write queue comprises selecting the preemptable write queue or the non-preemptable write queue based on a current length of a buffer queue to which the packet is to be written in the memory device.

Selecting the write queue based on the current length of the buffer queue in the memory device comprises comparing a current length of the buffer queue in the memory device to a threshold.

When the current length of the buffer queue in the memory does not exceed the threshold, selecting the preemptable write queue.

When the current length of the buffer queue in the memory exceeds the threshold, selecting the non-preemptable write queue.

Generating the read request includes generating the read request to include an address from which to retrieve the packet from the memory device.

Determining whether the packet is queued in the preemptable write queue comprises searching an exact match search engine for the address from which the packet is to be read from the memory device.

The method further comprise scheduling packets, from the preemptable write queue and the non-preemptable write queue, to be written to the memory device, wherein scheduling includes giving preference to the non-preemptable write queue with respect to the preemptable write queue.

Giving preference to the non-preemptable write queue with respect to the preemptable write queue includes determining that the non-preemptable write queue is eligible for scheduling if a fill level of the non-preemptable write queue is greater than zero, and determining that the preemptable write queue is eligible for scheduling if a fill level of the preemptable write queue exceeds a threshold that is greater than zero.

The method further comprises monitoring, at the memory controller, respective fill levels of the non-preemptable write queue and the preemptable write queue, and when the fill level of the non-preemptable write queue or the fill level of the preemptable write queue exceeds a threshold, providing, from the memory controller to the queue manager, a backpressure signal instructing the queue manager to temporarily stop sending write requests to the preemptable write queue and the non-preemptable write queue.

The method further comprises in response to determining that the packet is not queued in the preemptable write queue, enqueuing the read request in a read queue, and subsequently retrieving the packet from the memory device.

In another embodiment, a traffic manager for managing network packets to be transmitted from a network device comprises a plurality of write queues configured to queue packets to be written to a memory device coupled to the traffic manager, the memory device being configured to store packets that are ready for transmission from the network device. The traffic manager also comprises a queue manager configured to select a write queue, from the plurality of write queues, for queuing a packet to be written to the memory device, the write queue being selected from among (i) a preemptable write queue configured to queue packets that are candidates for being retrieved from the traffic manager before the packets are written to the memory device and (ii) a non-preemptable write queue configured to store packets that are not candidates for being retrieved from the traffic manager before the packets are written to the memory device. The queue manager is further configured to write the packet to the selected one of the preemptable write queue or the non-preemptable write queue. The traffic manager additionally comprises a preemptor engine configured to receive a read request for retrieving the packet from the memory device, and determine whether packet is queued in the preemptable write queue. The preemptor engine is also configured to, in response to determining that the packet is queued in the preemptable write queue, extract the packet from the preemptable write queue for retrieving the packet from the traffic manager before the packet is written to the memory device.

In other embodiments, the traffic manager includes any suitable combination of one or more of the following features.

The queue manager is configured to select the preemptable write queue or the non-preemptable write queue based on a current length of a buffer queue to which the packet is to be written in the memory device.

The queue manager is configured to compare an indicator of the current length of the buffer queue in the memory device to a threshold, and when the indicator of the current length of the buffer queue does not exceed the threshold, select the preemptable write queue, and when the indicator of the current length of the buffer queue exceeds the threshold, select the non-preemptable write queue.

The queue manager is configured to generate the read request to include an address from which to retrieve the packet from the memory device.

The preemptor engine is configured to determine whether the packet is queued in the preemptable write queue by searching an exact match search engine for the address from which the packet is to be read from the memory device.

The traffic manager further comprises a scheduler configured to schedule packets, from the preemptable write queue and the non-preemptable write queue, to be written to the memory device, wherein the scheduler is configured to give scheduling preference to the non-preemptable write queue.

The scheduler is configured to, when scheduling the packets, determine that the non-preemptable write queue is eligible for scheduling if a fill level of the non-preemptable write queue is greater than zero, and determine that the preemptable write queue is eligible for scheduling if a fill level of the preemptable write queue exceeds a threshold that is greater than zero.

The memory controller is further configured to monitor respective fill levels of the non-preemptable write queue and the preemptable write queue, and when the fill level of the non-preemptable write queue or the fill level of the preemptable write queue exceeds a threshold, provide, to the queue manager, a backpressure signal to instruct the queue manager to temporarily stop sending write requests to the preemptable write queue and the non-preemptable write queue.

The preemptor engine is configured to, in response to determining that the packet is not queued in the preemptable write queue, cause the read request to be enqueued in a read queue in the memory controller such that the packet is subsequently read from the memory device.

The preemptable write queue is sized to be longer than the non-preemptable write queue to increase amount of time that the packet is queued in the preemptable write queue before the packet is scheduled to be written to the memory device.

The queue manager and the memory controller are disposed on one or more integrated circuits.

The memory device is external to the one or more integrated circuits.

DETAILED DESCRIPTION

Figure 1:
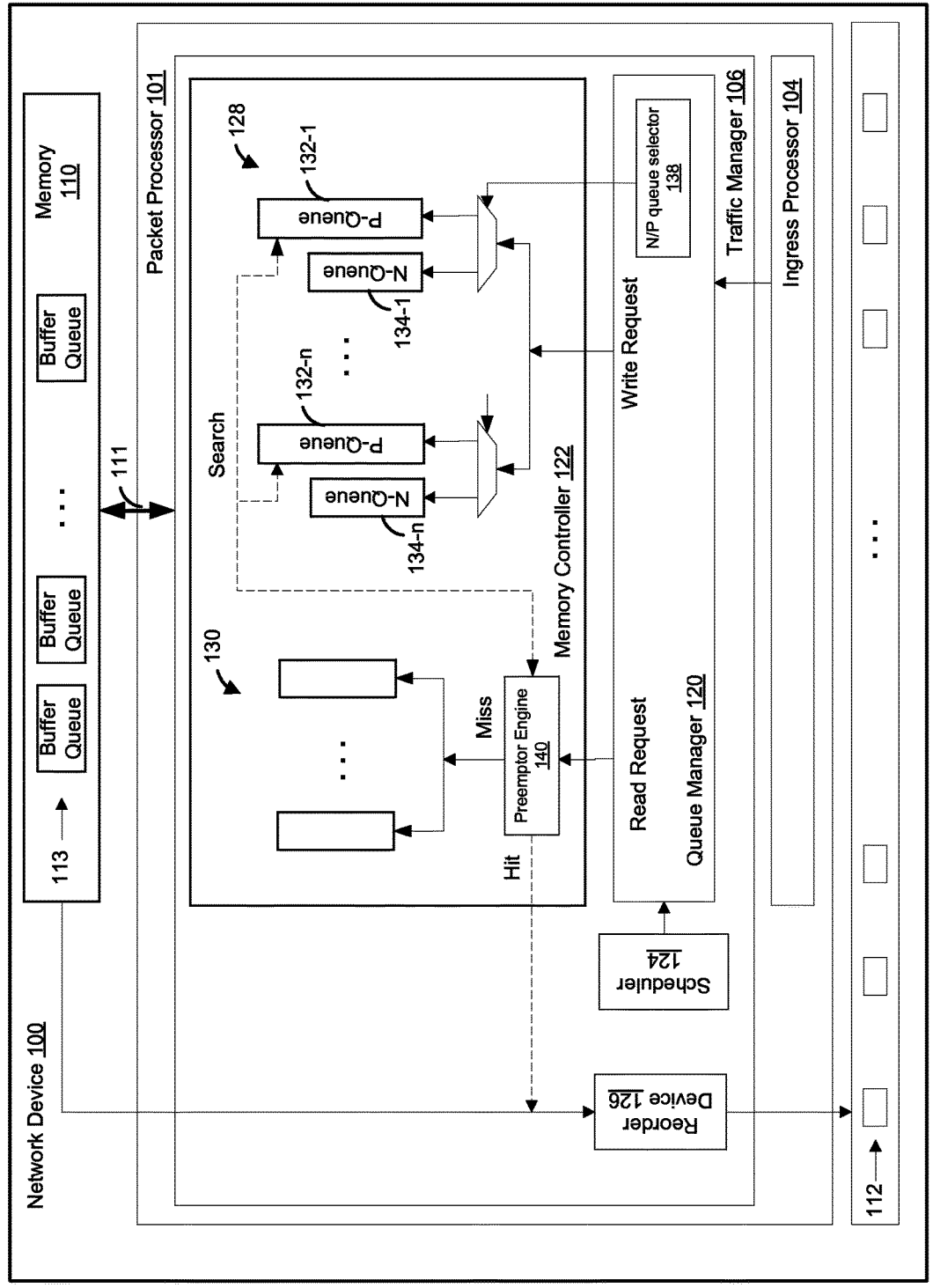
FIG. 1 is a block diagram of an example network device configured to implement dynamic memory bypass techniques of the present disclosure, according to an embodiment.

FIG. 1 is a simplified block diagram of an example network device 100 configured to implement dynamic memory bypass techniques of the present disclosure, according to an embodiment. The network device 100 is generally a computer networking device that connects two or more computer systems, network segments, subnets, and so on, on a computer network. For example, the network device 100 is a router or a network switch, in one embodiment. It is noted, however, that the switching device 100 is not necessarily limited to a particular protocol layer or to a particular networking technology (e.g., Ethernet). For instance, the network device 100 could also be a bridge, a VPN concentrator, etc.

The network device 100 includes a packet processor 102 coupled to a plurality of ports 112, and each of the ports 112 is coupled to a communication network (e.g., to another network device within a communication network) or to a final destination in the communication network. In some embodiments, each of ports 112 is a bidirectional port that can act as either an ingress port or an egress port. In other embodiments, ports are dedicated to be either ingress ports or egress ports. In general, the packet processor 102 is configured to process packets received via ingress ports 112, to determine respective egress ports 112 via which the packets should be transmitted, and to transmit the packets via the determined egress ports 112. In some embodiments, the packet processor 102 is configured to receive a packet at an ingress port 112, to store the packet in a memory, to perform processing of the packet while the packet is stored in the memory, to determine one or more egress ports 112 via which the packet should be transmitted, and, after making the forwarding decision, to retrieve the packet from the memory and transmit the packet via the one or more egress ports 112. In some embodiments, the packet processor 102 generates a packet descriptor corresponding to the packet, and the packet descriptor, rather than the packet itself, is subsequently processed by the packet processor 102 while the actual packet, or a portion of the packet, is stored in a memory. A packet descriptor includes some information from the packet, such as some or all of the header information of the packet, in an embodiment. In some embodiments, the packet descriptor additionally includes other information such as an indicator of where in the memory the packet is stored. In an embodiment, information in a packet descriptor corresponding to a packet, rather than the packet itself, is utilized to perform one or more processing operations on the packet that is stored in the memory. For ease of explanation, the term "packet" hereinafter is used to refer to a packet itself or to a packet descriptor associated with the packet.

With continued reference to FIG. 1, the packet processor 102 includes an ingress processor 104 configured to perform initial processing of packets that ingress via the ingress ports 112. In an embodiment, ingress processing performed by the ingress processor 104 includes determining at least one egress port 112 via which a packet is to be transmitted from the network device 100. Additionally, ingress processing performed by the ingress processing unit 104 includes classifying the packet based on one or more parameters associated with or determined for the packet, and assigning a particular traffic class and/or a particular data flow to the packet, in an embodiment. Different data flows or different traffic classes are associated with, for example, different types of packets, different quality of service (QoS) parameters, different priorities, etc., in an embodiment.

Packets processed by the ingress processor 104 are provided to a traffic manager 106 prior to being transmitted to another location in the computer network. The traffic manager 106 is coupled to a memory device 110 via a memory access channel 111, in an embodiment. While only one memory device 110 is shown in FIG. 1, two or more memory devices, arranged as a memory system, are provided in some embodiments. The memory device 110 includes a plurality of buffer queues 113 configured to queue packets for subsequent transmission from the network device 100. In an embodiment, each buffer queue 113 corresponds to an egress port 112 and is configured to queue packets to be transmitted from the egress port 112. In an embodiment, multiple buffer queues 113 are associated with each of at least some of the egress ports 112, each of the multiple buffer queues 113 associated with a particular egress port 112 further associated with a transmission parameter, such as a priority and/or a quality of service, for example. In some embodiments, each buffer queue 113 corresponds to a class of packets, defined for example by one or more or a source, a destination, a packet type, a priority, a quality of service, or other suitable class distinguishing characteristics.

The memory device 110 is a random access memory device, such as dynamic random access memory (DRAM) device, a static random access memory (SRAM) device, for example, in an embodiment. In another embodiment, the memory device 110 is another suitable type of memory device, such as for example, without limitation, a flash drive, a hard drive, or a solid state memory drive. The memory device 110 is coupled to the traffic manager 110 via an access channel 111. In an embodiment, the access channel 111 includes a look-aside engine (not shown) configured to map virtual addresses maintained by the traffic manager 106 to physical addresses in the memory device 110. In another embodiment, the traffic manager 106 operates with physical addresses in the memory device 100.

Although only a single memory device 110 is coupled to the traffic manager 106 via the channel 111 in the embodiment of FIG. 1, multiple memory devices 110, forming a memory system, are coupled to the traffic manager 106 via the channel 111 in other embodiments. For example, two memory devices 110 are coupled to the traffic manager 106 via the channel 111 in an embodiment. Other suitable numbers of memory devices 110 are coupled to the traffic manager 106 via the channel 111 in other embodiments. In some embodiments, the network device 100 includes multiple channels 111 that couple the traffic manager 106 to one or more memory devices 110. As merely an example, the network device 100 includes six channels 111, each channel 111 coupling two memory devices 110 to the traffic manager 106. Accordingly, the network device 100 includes twelve memory devices 110, in this example embodiment. The network device 100 includes other suitable numbers of channels 111 and/or other suitable numbers memory devices 110, in other embodiment. In an embodiment, components of the packet processor 101, such as the traffic manager 106, are disposed on one or more integrated circuits. In an embodiment, the one or more memory devices 110 are external to the one or more integrate circuits.

The traffic manager 106 includes a queue manager 120, a memory controller or a buffer access point (BAP) 122, a scheduler 124 and a reordering device 126. Packets received by the traffic manager 106 from the ingress processor 104 are provided to the queue manager 120, in an embodiment. The queue manager 120 determines a buffer queue 113 in which to queue the packet for subsequent transmission of the packet from the network device 100. For example, in an embodiment the queue manager 120 determines the buffer queue 113 in which to store a packet based on an indication obtained from a packet descriptor corresponding to the packet. In another embodiment, the queue manager 120 determines a buffer queue 113 in which to store a packet based on other information obtained from a header of the packet and/or from a packet descriptor corresponding to the packet. For example, the queue manager 120 determines a buffer queue 113 in which to store a packet based on an indication of a port 112 via which the packet is to be transmitted and further based on an indication of a type of the packet, an indication of a data flow to which the packet belongs, a quality of service indication, etc., extracted from a packet descriptor associated with the packet, in various embodiments.

Upon determining a buffer queue 113 in which to store a packet, the queue manager 120 generates a write request for writing the packet to the determined queue 113, and provides the write request to the memory controller 122, in an embodiment. Additionally, the queue manager 120 informs the scheduler 124 that a new packet is to be enqueued in the determined buffer queue 113, in an embodiment. The scheduler 124 uses this information for scheduling packets for retrieval from the determined buffer queue 113. For example, the scheduler 124 uses this information to determine that the buffer queue 113 is eligible for being scheduled, in an embodiment. Subsequently, the scheduler 124 schedules the buffer queue 113 de-queuing, and provides an indication to the queue manager 120 that a packet at the head of the buffer queue 113 is to be retrieved. In response to receiving the indication, the queue manager 120 generates a read request for retrieving a packet from the head of the buffer queue 113, and provides the read request to the memory controller 122. One or more packets at the head of the scheduled buffer queue 113 are then retrieved and subsequently provided to a port 112 for transmission of the packets from the port 112.

The memory controller 122 includes a plurality of write queues 128 and a plurality of read queues 130. In an embodiment, the write queues 128 are configured to queue write requests received from the queue manager 120 for subsequent writing of the corresponding packets to the appropriate buffer queues 113 in the memory device 122. In an embodiment, in some situations, packets are scheduled to be retrieved from the memory controller 122 before the packets are actually written to the memory device 110. For example, the scheduler 124 schedules transmission of packet (e.g., by scheduling transmission from a buffer queue 113 to which the packet is to be written) before the packet is actually written, in whole or in part, to the buffer queue 113 in the memory device 110, in some situations, in an embodiment. In an embodiment, in such situations, the packet is retrieved from the memory controller 122 before the packet is written to the memory device 110. To allow for efficient retrieval of packets from the memory controller 122 before the packets are written to the memory device 110, write queues in the memory controller 122 are subdivided into preemptable write queues (P-queues) and non-preemptable write queues (N-queues), as will be described in more detail below, in an embodiment. As will be explained in more detail below, efficient write queue architecture in the memory controller 120 such as described herein generally increases likelihood that a packet will be retrieved from the memory controller 122 before the packet is written to the memory device 110, thereby saving space used for buffering packets in the memory device 110 and saving bandwidth for writing and reading packets to/from the memory device 110, in at least some embodiments. Saving space and bandwidth in the memory device 110 increases space and bandwidth available for use by other components of the packet processor 101, for example in a system in which the memory device 110 is shared for buffering packets and for storing lookup tables, for example, in some embodiments. Moreover, retrieving a packet from the memory controller 122 before the packet is written to the memory device 110 reduces transmission latency for at least some packets, in at least some embodiments.

In an embodiment, the write queues 128 include a plurality of preemptable write queues 132 a plurality of non-preemptable write queues 134. Each preemptable write queue 132 and each non-preemptable write queue 134 is associated with a particular buffer queue 113 and is configured to queue write requests for packets to be written to the particular buffer queue 113, in an embodiment. The preemptable write queues 132 are configured to queue write requests corresponding to packets that are candidates for being retrieved from the memory controller 122 before the packets are written to the memory device 110. On the other hand, the non-preemptable write queues 134 are configured to queue write requests corresponding to packets that are not candidates for being retrieved from the memory controller 122. In an embodiment, when the memory controller 122 receives a write request for writing a packet to a particular buffer queue 113 in the memory device 110, the memory controller 110 enqueues the write request in one of (i) a preemptable write queue 132 associated with the particular buffer queue 113 or (ii) a non-preemptable write queue 134 associated with the particular buffer queue 113. For example, an N/P queue selector 138 of the queue manager 120 determines, for each write request generated by the queue manager 120, whether the write request is to be enqueued in a preemptable write queue 132 or a non-preemptable write queue 134 associated with the buffer queue 113.

In an embodiment, the N/P selector 138 selects a preemptable write queue 132 or a non-preemptable write queue 134 for queuing a write request corresponding to a packet to be written to a buffer queue 113 based on a likelihood that a read request for retrieving the packet from the buffer queue 113 will be received by the memory controller before the packet is actually written to the buffer queue 113. For example, in an embodiment, the N/P queue selector 138 selects a preemptable write queue 132 or a non-preemptable write queue 134 for a write request for a packet to be written to a particular buffer queue 113 based on an indication of a current length of the particular buffer queue 113, such as based on a number of packets or based on a number of bytes stored in the buffer queue 113 when the write request is generated by the queue manager 108. Generally, a read request for a packet to be retrieved from a buffer queue 113 is more likely to be generated before the packet is written to the buffer queue 113 if the buffer queue 113 is relatively longer (e.g., currently holds more packets) compared to when the buffer queue is relatively shorter (e.g., currently holds less packets), in at least some embodiments and/or scenarios. Accordingly, in an embodiment, the N/P selector 138 selects preemptable write queues 132 for write requests if the corresponding packets are to be written to currently relatively longer buffer queues 113, and selects non-preemptable write queue 134 for write requests if the corresponding packets are to be written to currently relatively longer buffer queues 113, in an embodiment. For example, in an embodiment, for a write request for writing a packet to a particular buffer queue 113, the N/P selector 138 compares an indicator of a current length of the particular buffer queue 113 to a threshold queue length, and selects preemptable or non-preemptable write queue for the write request based on the comparison of the indicator of the current length of the particular buffer queue 113 to the threshold. For example, the N/P selector 138 selects the preemptable write queue 132 associated with the buffer queue 113 if the current length indicator exceeds (or is greater than or equal to) the threshold, and selects the non-preemptable write queue 134 if the current length indicator does not exceed (or is less than or equal to) the threshold, in an embodiment.

In an embodiment, subdividing write queues 128 into preemptable write queues 132 and non-preemptable write queues 134, and appropriately selecting a preemptable write queue or a non-preemptable write queue for queuing a write request corresponding to a packet, for example based on a length of the buffer queue 113 to which the packet is to be written in the memory device 110, generally increases the likelihood that a packet will be preempted from being written to the memory device 110 for example compared to system which do not subdivide write queues into preemptable write queues and non-preemptable write queues. In at least some embodiments, efficiently sizing the preemptable write queues and the non-preemptable write queues, and efficiently scheduling de-queuing of the write queues, for example by giving preference to the non-preemptable write queues, as will be described in more detail below, further increases the likelihood that a packet will be preempted from being written to the memory device 110 for example compared to system which do not subdivide write queues into preemptable write queues and non-preemptable write queues. As just an example, in some embodiments, preemptable write queues are sized to be longer that non-preemptable write queue to allow the preemptable write queues to accumulate more packets while storing packets for a longer period of time as compared to non-preemptable write queues. As another example, in some embodiments, preemptable write queues have a higher fill level threshold for eligibility of the preemptable write queues to be de-queued as compared to a fill level threshold for eligibility of the non-preemptable write queues to be de-queued, in an embodiment. In general, such sizing and scheduling techniques increase an amount of time that a packet remains in the preemptable write queue before the packet is scheduled to be written to the memory device, in at least some embodiments and/or scenarios.

In an embodiment, when a read request for retrieving a packet from a buffer queue 113 is received by the memory controller 122, a preemptor engine 140 searches the preemptable write queues 132 associated with the buffer queue 113 to determine whether a write request corresponding to the packet is currently queued in the preemptable write queue 132. In an embodiment, if the search provides a "hit", i.e., if it is determined that a write request corresponding to the packet is currently queued in the preemptable write queue 132, then the corresponding packet is retrieved from the preemptable write queue 132 and is provided to the reorder device 126. Searching of the preemptable write queues 132 and, if a match is found in a preemptable write queue 132, retrieving the packet from the preemptable write queue 132, is indicated by bi-directional dashed arrow in FIG. 1. Further, the write request is removed from the preemptable write queue 132, in an embodiment. Accordingly, in this case, the packet is retrieved from the traffic manager 106 before the packet is written to the memory device 110. Thus, the packet is preempted from being written to the memory device 110, in this embodiment.

On the other hand, if the search results in a "miss", i.e., if it is determined that a write request corresponding to the packet is not currently stored in the preemptable write queue 132, then the read request is placed in a read queue 130 associated with the buffer queue 113 from which the packet is to be retrieved. Subsequently, the corresponding packet is retrieved the buffer queue 113 in the memory device 110, in an embodiment. The packet retrieved from the memory device 110 is then provided to the reorder device 126. The reorder device 126 ensures that packets retrieved from the memory device 110 and from the memory controller 112 are provided for transmission in the order in which the corresponding read requests were issued by the queue manager 120, in an embodiment.

Referring still to FIG. 1, in some embodiments in which the network device 100 includes multiple memory devices 110, the memory devices 110 and the corresponding channels 111 are shared resources that are used for buffering packets by the traffic manager 106 and for processing operations, such as lookup operations, performed by other components of the packet processor 101. For example, some of the memory devices 110 store various lookup tables, such as routing tables, policy control tables, etc., accessed by the packet processor 101 during processing of packets by the packet processor 101, in an embodiment. Reducing bandwidth used by the traffic manager 106 for writing packets to the memory devices 110 generally increases bandwidth available for use for other operations, such as lookup operations, performed by the packet processor 101, in at least some such embodiments.

Figure 2:
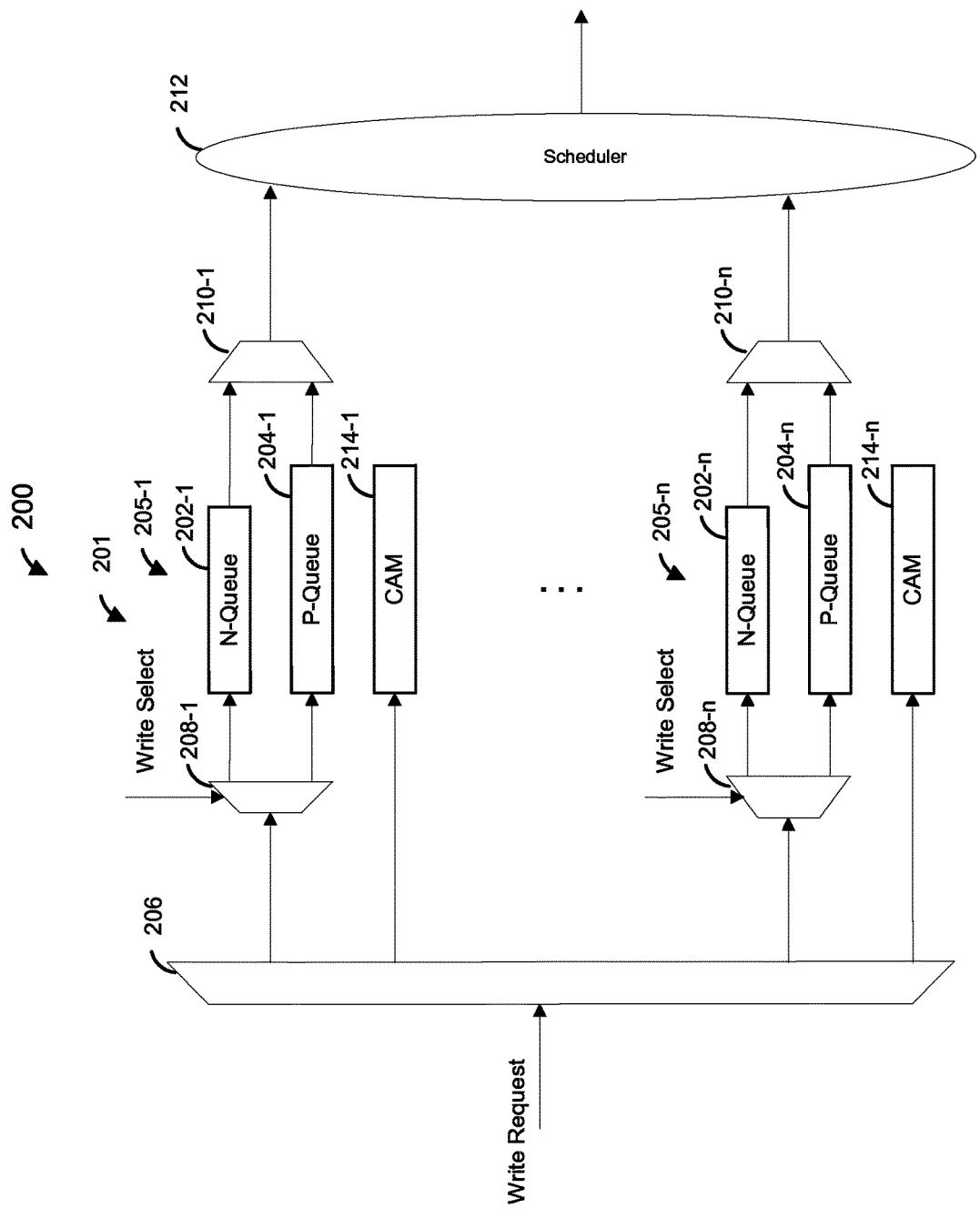
FIG. 2 is a block diagram of an example write request portion of a memory controller, according to an embodiment.

FIG. 2 is a block diagram of an example write processor 200 used with a network device such as the network device 100 of FIG. 1, according to an embodiment. In an embodiment, the write processor 200 is included in the memory controller 122 of the network device 100 of FIG. 1. For ease of explanation, the write processor 200 is described with reference to the network device 100 of FIG. 1. However, the write processor 200 is used with a network device different from the network device 100 in some embodiments. Similarly, the traffic manager 106 utilizes a write processor different from the write processor 200, in some embodiments.

The write processor 200 includes a plurality of write queues 201 which, in turn, includes a plurality of non-preemptable write queues 202 and a plurality of preemptable write queues 204. In an embodiment, the preemptable write queues 202 correspond to the preemptable write queues 132 of FIG. 1, and the non-preemptable write queues 204 correspond to the non-preemptable write queues 134 of FIG. 1. In an embodiment, respective N/P queue pairs 205 of non-preemptable write queues 202 and preemptable write queues 204 are associated with particular buffer queues 113 in the memory device 110. The write portion 200 additionally includes a first input selector device 206 a plurality of second input selector devices 208, a plurality of output selector devices 210, a scheduler 212 and a plurality of searchable memory devices or engines 214. Each searchable memory device or engine 214 is associated with a preemptable write queue 204 and is configured to store indications of write requests stored in the preemptable write queue 204, in an embodiment. In an embodiment, the searchable memory devices or engines 214 are content addressable memory (CAM) devices. In another embodiment, the searchable memory devices or engines 214 are other suitable memory devices, such as hash based exact match memory devices or engines, for example. Some example hash based exact match engines and search techniques, used in some embodiments, are described, for example, in U.S. patent application Ser. No. 13/737,608, filed on Jan. 9, 2013, and entitled "Exact Match Lookup in Network Switch Devices," which is hereby incorporated by reference herein in its entirety; U.S. patent application Ser. No. 14/012,834, filed on Aug. 28, 2013, and entitled "Exact Match Hash Lookup Databases in Network Switch Devices," which is hereby incorporated by reference herein in its entirety; and U.S. patent application Ser. No. 14/250,621, filed on Apr. 11, 2014, and entitled "Exact Match Lookup with Variable Key Sizes," which is hereby incorporated by reference herein in its entirety.

In an embodiment, the first input selector device 206 receives a write request for a packet to be written to a particular buffer queue 113, and directs the write request to the N/P queue pair associated with the particular buffer queue 113. A second input selector device 208 corresponding to the N/P queue pair associated with the particular buffer queue 113 receives the write request and directs the write request to the corresponding non-preemptable write queue 202 or the corresponding preemptable write queue 204 based on N/P queue selection made for the write request by the queue manager 120 as described with respect to FIG. 1, for example, in an embodiment. If the write request is written to the preemptable write queue 204, then an indication to indicate that the write request is stored in the preemptable write queue 204 is written to the corresponding CAM device 208, in an embodiment. For example, a write request corresponding to a packet includes the packet (e.g., packet data) and an address at which the packet is to be written in the memory device 110, in an embodiment. If the write request is written to a preemptable write queue 204, the address at which the packet is to be written in the memory device 110 is also written to the CAM device 214, in an embodiment.

The scheduler 212 selects N/P queue pairs to be services for de-queuing write requests for writing the corresponding packets to the buffer queues 113 in the memory device 110. Further, an output selector device 210 coupled to an output of an N/P queue pair 202 selects whether the corresponding non-preemptable write queue 202 or the corresponding preemptable write queue 204 is to be de-queued when the N/P queue pair is serviced by the scheduler 220, in an embodiment. The output selector 214 is controlled by the scheduler 212, in an embodiment. In an embodiment, to increase the likelihood that a write request stored in a preemptable write queue 202 will be preempted by retrieval of the corresponding packet from the memory controller 122 before the packet is written to the memory device 110, the scheduler 212 implement a selection technique that gives preference to selection of non-preemptable write queues 202, in an embodiment. For example, according to one example selection technique, a non-preemptable write queue 202 is eligible for selection if the non-preemptable write queue 202 is not empty, e.g., when at least one write request is stored in the non-preemptable write queue 202. On the other hand, a preemptable write queue 204 is eligible for selection if the length of the preemptable write queue 204 exceeds a threshold, wherein the threshold is greater than a length of one write request stored in the preemptable write queue 204, in at least some embodiments. Some scheduling techniques implemented by the scheduler 212 according to some example embodiments are described in more detail below with respect to FIG. 3.

Figure 3:
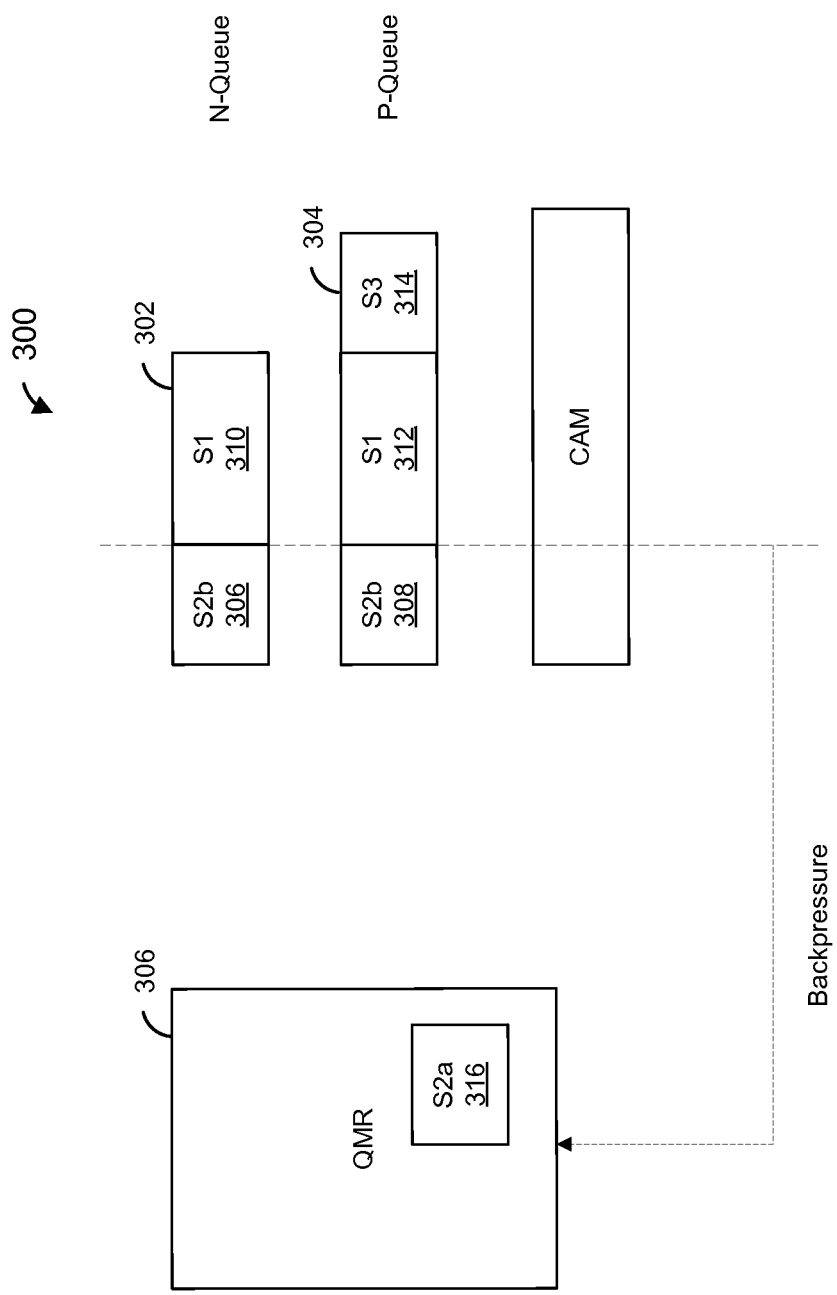
FIG. 3 is a block diagram of example preemptable and non-preemptable write queues implemented by the write request portion of FIG. 2, according to an embodiment.

In various embodiments, efficient sizing and backpressure techniques are used with the non-preemptable write queues 202 and the preemptable write queues 204 to maintain suitable fill levels of the write queues 202, 204 while also increasing the amount of time that write requests remain in the preemptable write queues 204 before the corresponding packets are scheduled to be written to the memory device 110 thereby increasing the likelihood that these packets will be preempted from being written to the memory device 110. Referring briefly to FIG. 3, example queue pair 300 includes a non-preemptable write queue 302 and a preemptable write queue 304 coupled to a queue manager 306. In an embodiment, the queue pair 300 corresponds to each of the N/P queue pair 205 of FIG. 2. The preemptable write queue 304 is longer than the non-preemptable write queue 302, in an embodiment. Sizing the preemptable write queue 304 to be longer than the non-preemptable write queue 302 allows the preemptable write queue 304 to queue more packets, and to queue packets for longer periods of time as compared to the non-preemptable write queue 302, thereby increasing the likelihood of preemption of a packet from the preemptable write queue 302, in at least some embodiments. In other embodiments, however, the preemptable write queue 304 is the same size as, or is shorter than, the non-preemptable write queue 302.

Each of preemptable write queue 302 and the non-preemptable write queue 304 includes a respective portion 306, 308 marked in FIG. 3 as a portion S2b. In an embodiment, when either the portion S2b 306 of the non-preemptable write queue 302 or the portion S2b 308 of the preemptable write queue 304 is filled, a backpressure signal is sent to the queue manager 306 to instruct the queue manager 306 to stop sending new write requests to the queues 300. In an embodiment, the portions S2b 306, 308 are of an equal size, sized to ensure that write requests that are already in transit from the queue manager 306 to the queues 300 can be successfully written to the appropriate queue 300, in an embodiment. Subsequently, when fill levels of the queues 300 fall below the threshold corresponding to the length of the portion S2b, a new backpressure signal is sent to the queue manager 306 to instruct the queue manager 306 to resume sending write requests to the queues 300, in an embodiment. Although the portions S2b 306, 308 are described above to be of an equal size, the portions S2b 306, 308 are of different sizes in other embodiments. In an embodiment, the portions S2b 306, 308 constitute a shared pool of memory. In an embodiment, when the manager 306 is unable to send write requests to the queues 302, 304, the queue manager 306 temporarily stores at least some of the write requests in a memory S2a 316. The memory S2a 316 is included in the queue manager 306 or is included in the memory controller that includes the write queues 302, 304, in various embodiments.

In an embodiment, the non-preemptable write queue 302 and preemptable write queue 304 each includes a respective second portion 310, 312 marked in FIG. 3 as portion S1. The portions S1 310, 312 are sized such that write requests in transit to the queues 300 when backpressure signal is asserted can still be written to the appropriate queues 300, in an embodiment. The portions S1 310, 312 are of an equal size, in an embodiment. The portions S1 310, 312 are of different sizes, in other embodiments. In an embodiment, the preemptable write queue 304 further includes a third portion 314 marked in FIG. 3 as a portion S3. The portion S3 314 is sized to increase the number of write requests that can be written to the preemptable write queues 302 as compared to the number of write requests that can be written to the non-preemptable write queues 304, in an embodiment. In an embodiment, separate backpressure signals are sent to the queue manager 306 to separately instruct the queue manager 306 to stop sending write requests directed to preemptable write queues 302 and write requests directed to non-preemptable write queues 304. For example, while portion S2b 306 serves as a threshold for sending or asserting the backpressure signal corresponding to the non-preemptable write queue 302, portion S3 314 serves as a threshold for sending the backpressure signal corresponding to the preemptable write queue 304, in an embodiment. Further, portion S3 314 serves as the threshold for eligibility of a preemptable write queue 304 for selection by the selectors 210 to be de-queued, in an embodiment. In an embodiment, if the non-preemptable write queue 302 and the preemptable write queue 304 are both eligible for de-queuing, then a queue to be de-queued is selected based on the current fill levels of the non-preemptable write queue 302 and the preemptable write queue 304 according to $$\text{selected queue} = \arg\max\nolimits_{\{p,n\}}(\text{Level}_p - S_3, \text{Level}_n) \quad \text{Equation 1}$$

where $\text{Level}_p$ is the current fill level of the preemptable write queue 304, $\text{Level}_n$ is the current fill level of the non-preemptable write queue 302, and S3 is the threshold determined by the portion S3 314, in an embodiment. Generally, such queue sizing, backpressure indication, and de-queuing techniques result in more write requests being written to the preemptable write queues 304, and also results in the write requests written to the preemptable write queues 304 being queued in the preemptable write queues 304 for a longer period of time before the corresponding packets are written to the memory device 110, thereby increasing the likelihood that the packets corresponding to the write requests in the preemptable write queues 304 will be preempted from being written to the memory device 110, in at least some embodiments and/or scenarios.

Figure 4:
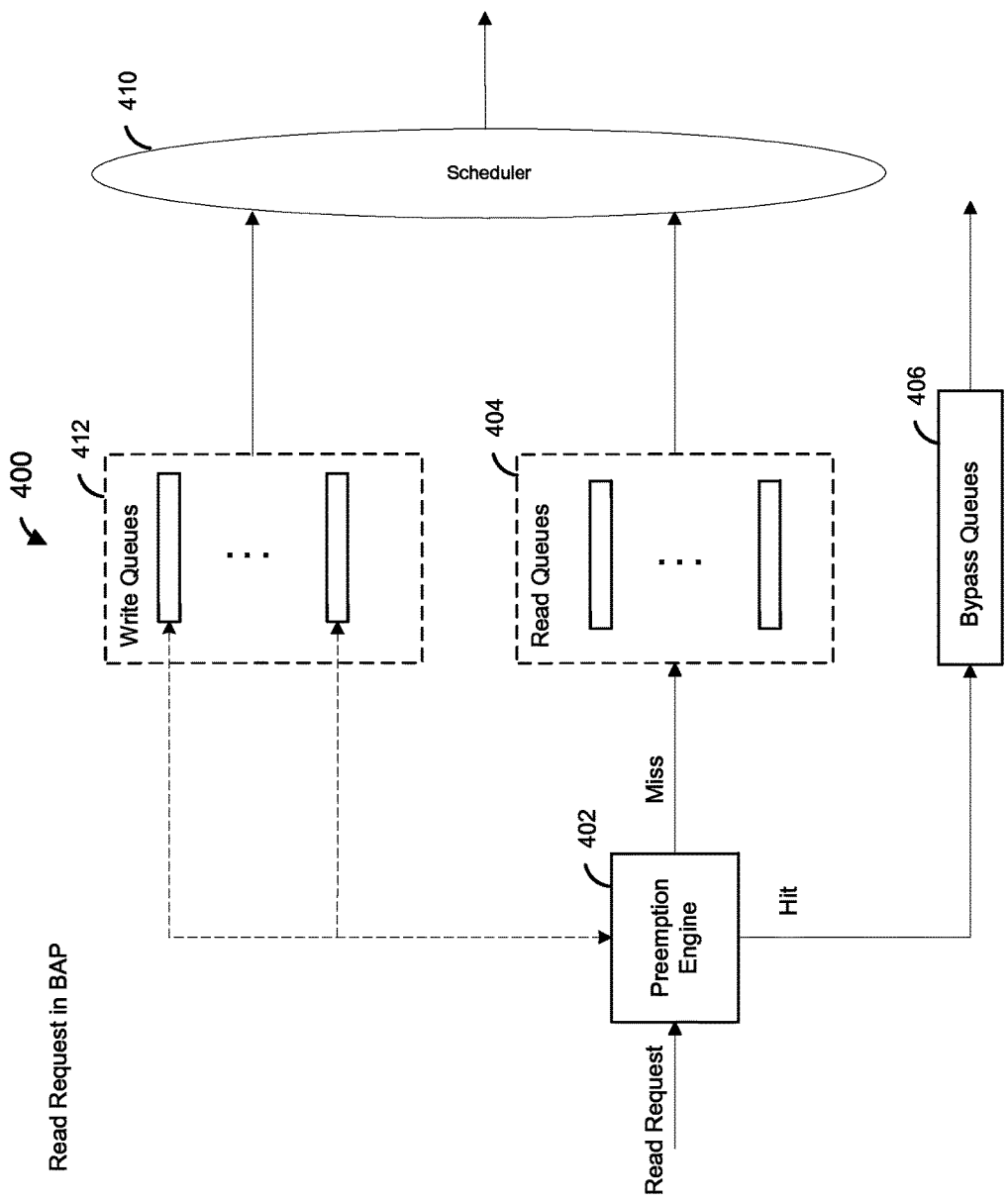
FIG. 4 is a block diagram of an example read request portion of a memory controller, according to an embodiment.

FIG. 4 is a block diagram of an example read processor 400 used with a network device such as the network device 100 of FIG. 1, according to an embodiment. In an embodiment, the read processor 400 is included in the memory controller 122 of the network device 100 of FIG. 1. For ease of explanation, the read processor 400 is described with reference to the network device 100 of FIG. 1. However, the read processor 400 is used with a network device different from the network device 100 in some embodiments. Similarly, the traffic manager 106 utilizes a read processor different from the read processor 400, in some embodiments.

The read processor 400 includes a preemptor engine 402, a plurality of read queues 404, a bypass queue 406, and a scheduler 410. In an embodiment, the preemptor engine 404 corresponds to the preemptor engine 140 of FIG. 1 and the read queues 404 correspond to the read queues 130 of FIG. 1. Also illustrated in FIG. 4 is a plurality of write queues 412. The write queues 412 correspond to the write queues 201 of FIG. 2, in an embodiment. The write queues 412 include N/P queue pairs and corresponding CAM devices as described above with respect to FIG. 2, in an embodiment. In an embodiment, the scheduler 410 is combined with the scheduler 212 of FIG. 2. For example, a single scheduler is used to alternatively schedule de-queuing write requests and read requests for writing to and reading from the memory device 110 via a read/write channel 111, in an embodiment.

In an embodiment, when the read processor 400 receives a read request for retrieving a packet from the memory device 110, the preemptor engine 402 searches the preemptable write queue, associated with the buffer queue 113 indicated by the read request, to determine whether a write request corresponding to the packet is currently queued in the preemptable write queue. For example, the search engine 402 searches the CAM device corresponding to the preemptable write queue for the address indicated by the read request for reading the packet from the memory device 110, in an embodiment. In an embodiment, if the search provides a "hit", i.e., if it is determined that a write request with the corresponding address is stored in the preemptable write queue, then the packet is retrieved from the preemptable write queue and is placed in the bypass queue 406, in an embodiment. Further, the corresponding write request is removed from the preemptable write queue, in an embodiment. Accordingly, the packet is preempted from being written to the memory device 110.

On the other hand, if the search results in a "miss", i.e., if it is determined that a write request with the corresponding address is not stored in the preemptable write queue, then the read request is placed in a read queue 404 associated with the buffer queue 113 from which the packet is to be read from the memory device 110. In an embodiment, the read request is subsequently scheduled to be de-queued by the scheduler 410, and the corresponding packet is retrieved from the indicated address in the memory device 110, in an embodiment. In an embodiment, the scheduler 410 performs any suitable scheduling non-weighted or weighted scheme, such as non-weighted or weighted round robin selection, to de-queue the read requests from the read request queues 404.

Figure 5:
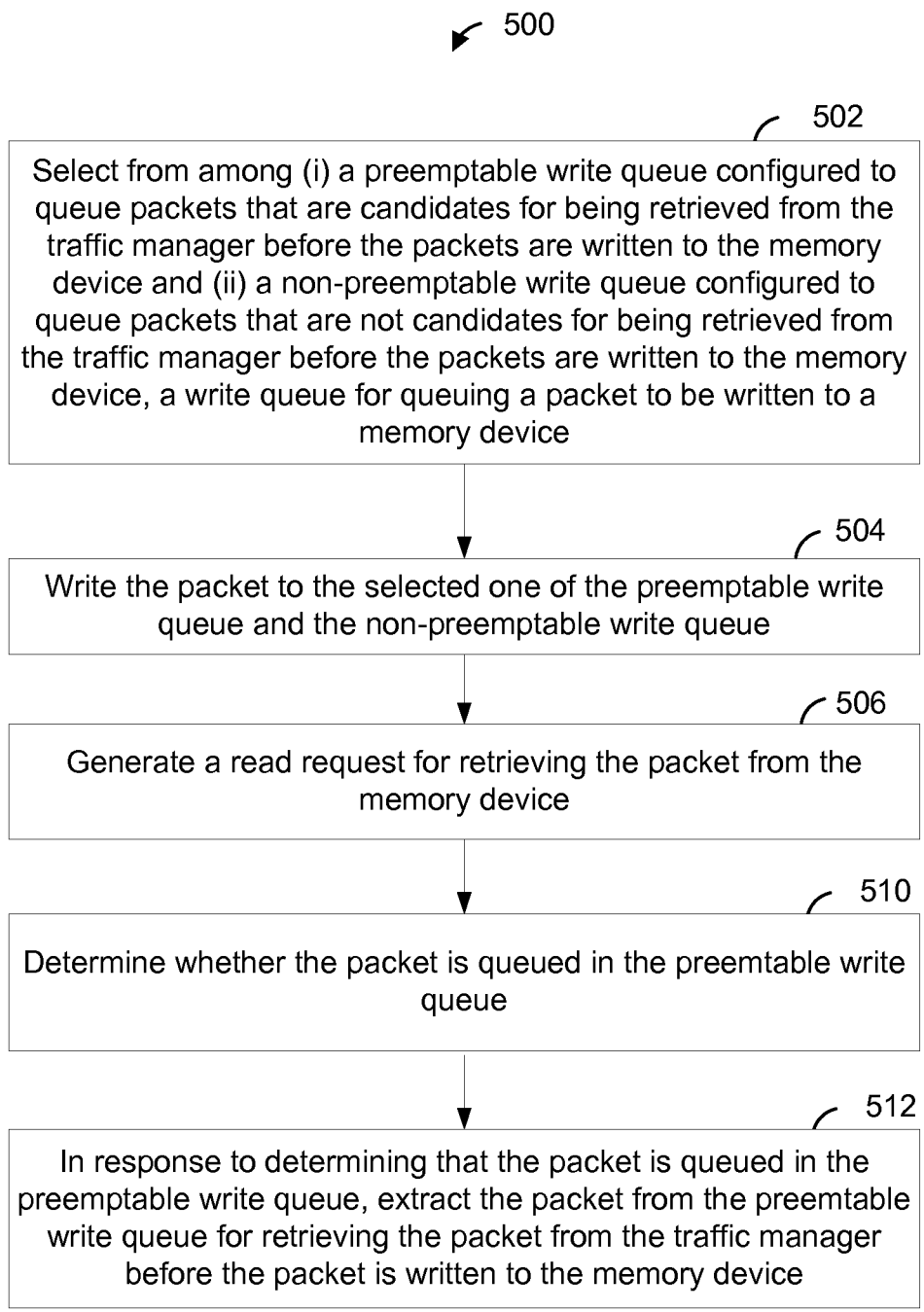
FIG. 5 is a flow diagram of an example method for managing network packets in a traffic manager coupled to a memory device, according to an embodiment.

FIG. 5 is a flow diagram of an example method 500 for managing network packets in a traffic manager coupled to a memory device, according to an embodiment. In an embodiment, the method 500 is implemented by a network device such as network device 100 of FIG. 1, for example. More specifically, in an embodiment, the method 500 is implemented by a traffic manager such as the traffic manager 106 of FIG. 1, for example.

At block 502, a preemptable write queue or non-preemptable write queue is selected for queuing a packet in a memory controller coupled to the memory device. In an embodiment, the preemptable write queue is configured to queue packets that are candidates for being retrieved from the traffic manager before the packets are written to the memory device, and the non-preemptable write queue is configured to queue packets that are not candidates for being retrieved from the traffic manager before the packets are written to the memory device.

At block 504, the packet is queued in the memory controller for subsequent writing of the packet to the memory device. In an embodiment, at block 504, the packet is queued in the preemptable write queue or the non-preemptable write queue according to the selection made at block 502. In an embodiment, queuing the packet comprises queuing a write request corresponding to the packet. In an embodiment, the write request includes the packet and further includes an address at which the packet is to be written in the memory device. In an embodiment, when the packet, or the write request corresponding to the packet, is queued in the preemptable write queue, the address at which the packet is to be written to the memory device is added to an exact match search engine, such as a CAM device, associated with the preemptable write queue to indicate that a write request corresponding to the packet is queued in the preemptable write queue.

At block 506, a read request for retrieving the packet from the memory device is generated. In an embodiment, the read request includes an address from which the packet is to be retrieved from the memory device.

At block 510, it is determined whether the packet, or the write request corresponding to the packet, is queued in the preemptable write queue. For example, the address included in the read request is used as a search key to the CAM device associated with preemptable write queue to determine whether the packet, or the write request corresponding to the packet, is queued in the preemptable write queue.

At block 512, in response to determining at block 510 that the packet is queued in the preemptable write queue, the packet is extracted from the preemptable write queue for retrieving of the packet from the traffic manager before the packet is written to the memory device. In an embodiment, the method further includes in response to determining at block 510 that the packet is not queued in the preemptable write queue, enqueuing the read request in a read queue in the traffic manager for subsequent retrieval of the packet from the memory device.

At least some of the various blocks, operations, and techniques described above may be implemented utilizing hardware, a processor executing firmware instructions, a processor executing software instructions, or any combination thereof. When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of managing network packets in a traffic manager coupled to a memory device, the method comprising:

selecting, at a queue manager of the traffic manager, a write queue for queuing, at the traffic manager, a packet to be written to the memory device, including selecting the write queue from among (i) a preemptable write queue configured to queue packets that are candidates for being retrieved from the traffic manager before the packets are written to the memory device and (ii) a non-preemptable write queue configured to queue packets that are not candidates for being retrieved from the traffic manager before the packets are written to the memory device;

writing, by the queue manager, the packet to the selected one of the preemptable write queue or the non-preemptable write queue;

generating, at the traffic manager, a read request for retrieving the packet from the memory device;

determining, by a preemptor engine of the traffic manager, whether the packet is queued in the preemptable write queue; and in response to determining that the packet is queued in the preemptable write queue, extracting, by the preemptor engine, the packet from the preemptable write queue for retrieving the packet from the traffic manager before the packet is written to the memory device.

2. The method of claim 1, wherein selecting the write queue comprises selecting the preemptable write queue or the non-preemptable write queue based on a current length of a buffer queue to which the packet is to be written in the memory device.

3. The method of claim 2, wherein selecting the write queue based on the current length of the buffer queue in the memory device comprises
comparing a current length of the buffer queue in the memory device to a threshold;
when the current length of the buffer queue in the memory does not exceed the threshold, selecting the preemptable write queue; and
when the current length of the buffer queue in the memory exceeds the threshold, selecting the non-preemptable write queue.

4. The method of claim 1, wherein generating the read request includes generating the read request to include an address from which to retrieve the packet from the memory device.

5. The method of claim 4, wherein determining whether the packet is queued in the preemptable write queue comprises searching an exact match search engine for the address from which the packet is to be read from the memory device.

6. The method of claim 1, further comprising scheduling packets, from the preemptable write queue and the non-preemptable write queue, to be written to the memory device, wherein scheduling includes giving preference to the non-preemptable write queue with respect to the preemptable write queue.

7. The method of claim 6, wherein giving preference to the non-preemptable write queue with respect to the preemptable write queue includes
determining that the non-preemptable write queue is eligible for scheduling if a fill level of the non-preemptable write queue is greater than zero, and
determining that the preemptable write queue is eligible for scheduling if a fill level of the preemptable write queue exceeds a threshold that is greater than zero.

8. The method of claim 1, further comprising
monitoring, at the memory controller, respective fill levels of the non-preemptable write queue and the preemptable write queue, and
when the fill level of the non-preemptable write queue or the fill level of the preemptable write queue exceeds a threshold, providing, from the memory controller to the queue manager, a backpressure signal instructing the queue manager to temporarily stop sending write requests to the preemptable write queue and the non-preemptable write queue.

9. The method of claim 1, further comprising in response to determining that the packet is not queued in the preemptable write queue,
enqueuing the read request in a read queue, and
subsequently retrieving the packet from the memory device.

10. A traffic manager for managing network packets to be transmitted from a network device, the traffic manager comprising
a plurality of write queues configured to queue packets to be written to a memory device coupled to the traffic manager, the memory device being configured to store packets that are ready for transmission from the network device;
a queue manager configured to
select a write queue, from the plurality of write queues, for queuing a packet to be written to the memory device, the write queue being selected from among (i) a preemptable write queue configured to queue packets that are candidates for being retrieved from the traffic manager before the packets are written to the memory device and (ii) a non-preemptable write queue configured to store packets that are not candidates for being retrieved from the traffic manager before the packets are written to the memory device, and
write the packet to the selected one of the preemptable write queue or the non-preemptable write queue; and
a preemptor engine configured to
receive a read request for retrieving the packet from the memory device,
determine whether packet is queued in the preemptable write queue, and
in response to determining that the packet is queued in the preemptable write queue, extract the packet from the preemptable write queue for retrieving the packet from the traffic manager before the packet is written to the memory device.

11. The traffic manager of claim 10, wherein the queue manager is configured to select the preemptable write queue or the non-preemptable write queue based on a current length of a buffer queue to which the packet is to be written in the memory device.

12. The traffic manager of claim 11, wherein the queue manager is configured to
compare an indicator of the current length of the buffer queue in the memory device to a threshold;
when the indicator of the current length of the buffer queue does not exceed the threshold, select the preemptable write queue; and
when the indicator of the current length of the buffer queue exceeds the threshold, select the non-preemptable write queue.

13. The traffic manager of claim 10, wherein the queue manager is configured to generate the read request to include an address from which to retrieve the packet from the memory device.

14. The traffic manager of claim 13, wherein the preemptor engine is configured to determine whether the packet is queued in the preemptable write queue by searching an exact match search engine for the address from which the packet is to be read from the memory device.

15. The traffic manager of claim 10, further comprising a scheduler configured to schedule packets, from the preemptable write queue and the non-preemptable write queue, to be written to the memory device, wherein the scheduler is configured to give preference to the non-preemptable write queue.

16. The traffic manager of claim 15, wherein the scheduler is configured to, when scheduling the packets
determine that the non-preemptable write queue is eligible for scheduling if a fill level of the non-preemptable write queue is greater than zero, and
determine that the preemptable write queue is eligible for scheduling if a fill level of the preemptable write queue exceeds a threshold that is greater than zero.

17. The traffic manager of claim 15, wherein the memory controller is further configured to
monitor respective fill levels of the non-preemptable write queue and the preemptable write queue, and when the fill level of the non-preemptable write queue or the fill level of the preemptable write queue exceeds a threshold, provide, to the queue manager, a backpressure signal to instruct the queue manager to temporarily stop sending write requests to the preemptable write queue and the non-preemptable write queue.

18. The traffic manager of claim 10, wherein the preemptor engine is configured to, in response to determining that the packet is not queued in the preemptable write queue cause the read request to be enqueued in a read queue in the memory controller such that the packet is subsequently read from the memory device.

19. The traffic manager of claim 10, wherein the preemptable write queue is sized to be longer than the non-preemptable write queue to increase amount of time that the packet is queued in the preemptable write queue before the packet is scheduled to be written to the memory device.

20. The traffic manager of claim 10, wherein
the queue manager and the memory controller are disposed on one or more integrated circuits, and
the memory device is external to the one or more integrated circuits.

\* \* \* \* \*